US012759562B2

(12) United States Patent
Won

(10) Patent No.: US 12,759,562 B2
(45) Date of Patent: Oct. 13, 2026

(54) DRIVER ASSISTANCE SYSTEM AND DRIVER ASSISTANCE METHOD

(71) Applicant: HL KLEMOVE CORP., Incheon (KR)

(72) Inventor: Giyeon Won, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 312 days.

(21) Appl. No.: 18/126,942

(22) Filed: Mar. 27, 2023

(65) Prior Publication Data

US 2023/0322235 A1 Oct. 12, 2023

(30) Foreign Application Priority Data

Mar. 28, 2022 (KR) ........................ 10-2022-0038167

(51) Int. Cl.

*B60W 40/09* (2012.01)
*B60W 40/10* (2012.01)
*B60W 50/08* (2020.01)

(52) U.S. Cl.

CPC ............ *B60W 40/09* (2013.01); *B60W 40/10* (2013.01); *B60W 50/08* (2013.01);
(Continued)

(58) Field of Classification Search

CPC ................. B60W 40/09; B60W 50/08; B60W 2540/223; B60W 2540/227;
(Continued)

(56) References Cited

U.S. PATENT DOCUMENTS

| | | | | |
|---|---|---|---|---|
| 6,218,947 B1 * | 4/2001 | Sutherland ............. | G08B 21/06 340/545.4 |
| 2008/0042856 A1 * | 2/2008 | Power .................... | G08B 21/06 340/575 |

(Continued)

FOREIGN PATENT DOCUMENTS

| | | |
|---|---|---|
| JP | 2006-305035 | 11/2006 |
| KR | 10-2011-0069992 | 6/2011 |

(Continued)

OTHER PUBLICATIONS

Office Action for Korean Patent Application No. 10-2022-0038167 issued on Mar. 31, 2023 and its English translation by Google Translate.

*Primary Examiner* — Stephanie T Su
(74) *Attorney, Agent, or Firm* — WOMBLE BOND DICKINSON (US) LLP

(57) ABSTRACT

Disclosed herein is a driver assistance system including a gripping detection sensor provided on a steering wheel of a vehicle and configured to detect a driver gripping the steering wheel and acquire gripping information, and a controller configured to receive the gripping information from the gripping detection sensor, receive behavior information from a behavior detection device configured to acquire the behavior information of the vehicle, and determine whether the driver is dozing, wherein the controller is configured to match the gripping information according to the behavior information, predict gripping information according to current behavior information based on a result of the matching to generate gripping prediction information, and compare current gripping information with the gripping prediction information according to the current behavior information to determine whether the driver is dozing.

11 Claims, 10 Drawing Sheets

(52) U.S. Cl.
CPC . *B60W 2540/223* (2020.02); *B60W 2540/227* (2020.02); *B60W 2540/26* (2013.01)

(58) Field of Classification Search
CPC ..... B60W 2540/26; B60W 2040/0827; B60W 40/08; B60W 50/0097; B60W 50/14; B60K 28/06; G08B 21/06
See application file for complete search history.

(56) References Cited

U.S. PATENT DOCUMENTS

| | | | | |
|---|---|---|---|---|
| 2015/0032334 | A1* | 1/2015 | Jang | B60W 10/20 701/42 |
| 2017/0166237 | A1* | 6/2017 | Oh | B62D 1/046 |
| 2018/0170326 | A1* | 6/2018 | Wang | B60T 7/10 |

FOREIGN PATENT DOCUMENTS

| | | |
|---|---|---|
| KR | 10-2014-0082164 | 7/2014 |
| KR | 10-2018-0109254 | 10/2018 |
| KR | 10-2020-0070584 | 6/2020 |
| KR | 10-2021-0086014 | 7/2021 |

* cited by examiner

DRIVER ASSISTANCE SYSTEM AND DRIVER ASSISTANCE METHOD

CROSS-REFERENCE TO RELATED APPLICATION

This application claims the benefit of Korean Patent Application No. 10-2022-0038167, filed on Mar. 28, 2022 in the Korean Intellectual Property Office, the disclosure of which is incorporated herein by reference.

BACKGROUND

1. Field

Embodiments of the present disclosure relate to a driver assistance system and a driver assistance method, and more specifically, to a driver assistance system and a driver assistance method, which are capable of analyzing behavior information of a vehicle and gripping information of a steering wheel to detect a driver's dozing.

2. Description of the Related Art

Recently, traffic accidents caused by drowsy driving are increasing. Therefore, studies to prevent the drowsy driving are being actively conducted.

In order to detect and alert dozing, it may be determined whether a driver grips a steering wheel. A hands-off alert may be output visually or audibly when the driver does not grip the steering wheel for a predetermined time. A vehicle may determine whether the driver grips the steering wheel using a torque sensor, a static electricity sensor, an infrared sensor, etc. provided in the vehicle and output an alert to inform the driver to wake up and grip the steering wheel when the driver does not grip the steering wheel.

However, there is a limit to detecting the driver's dozing only with the hands-off. There is a problem that the driver's dozing may not be detected when the driver is dozing in a state of gripping the steering wheel, and even when the driver is not dozing, an unnecessary alert is output when the driver does not grip the steering wheel.

SUMMARY

Therefore, it is an aspect of the present disclosure to provide a driver assistance system and a driver assistance method, which are capable of analyzing behavior information of a vehicle and gripping information of a steering wheel to detect a driver's dozing.

Additional aspects of the disclosure will be set forth in part in the description which follows and, in part, will be obvious from the description, or may be learned by practice of the disclosure.

In accordance with one aspect of the present disclosure, a driver assistance system includes a gripping detection sensor provided on a steering wheel of a vehicle and configured to detect a driver gripping the steering wheel and acquire gripping information, and a controller configured to receive the gripping information from the gripping detection sensor, receive behavior information from a vehicle behavior detection device configured to acquire the behavior information of the vehicle, and determine whether a driver is dozing, wherein the controller may be configured to match the gripping information according to the behavior information, predict gripping information according to current behavior information based on a result of the matching to generate gripping prediction information, and compare current gripping information with the gripping prediction information according to the current behavior information to determine whether the driver is dozing.

The gripping information may include contact area information and contact position information between a hand of the driver and the steering wheel as the driver grips the steering wheel, and the controller may be configured to match the area information and the position information according to the behavior information, generate area prediction information and position prediction information according to the received current behavior information based on a result of the matching, and compare current area information and current position information with the area prediction information and the position prediction information according to the current behavior information, respectively, to determine whether the driver is dozing.

The gripping information may further include contact shape information between the hand of the driver and the steering wheel as the driver grips the steering wheel, and the controller may be configured to further match the shape information according to the behavior information, further generate shape prediction information according to the received behavior information based on a result of the matching, and further compare current shape information with the shape prediction information according to the current behavior information to determine whether the driver is dozing.

The gripping information may further include information on pressure applied to the steering wheel as the driver grips the steering wheel, and the controller may be configured to further match the pressure information according to the behavior information, further generate pressure prediction information according to the received behavior information based on a result of the matching, and further compare current pressure information with the pressure prediction information according to the current behavior information to determine whether the driver is dozing.

The behavior information may include any one of a vehicle speed, a steering angle, a yaw rate, a lateral acceleration, and a longitudinal acceleration.

The controller may be configured to match the gripping information according to the behavior information for each piece of driver identification information received from a driver identification device of the vehicle, generate gripping prediction information according to the received current behavior information based on a result of the matching for each piece of driver identification information, and compare the current gripping information with the gripping prediction information according to the current behavior information generated based on a result of the matching for each piece of driver identification information to determine whether the driver is dozing.

The controller may output an alert to the driver through a driver alert device provided in the vehicle when the driver's dozing is detected.

The controller may learn and match the gripping information according to a machine learning algorithm when matching the gripping information according to the behavior information.

In accordance with another aspect of the present disclosure, a driver assistance system includes a controller configured to receive gripping information from a gripping detection sensor provided on a steering wheel of a vehicle and configured to detect a driver gripping the steering wheel to acquire the gripping information, receive behavior information from a vehicle behavior detection device configured to acquire the behavior information of the vehicle, and determine whether a driver is dozing, wherein the controller may be configured to match the gripping information according to the behavior information, predict gripping information according to current behavior information based on a result of the matching to generate gripping prediction information, and compare current gripping information with the gripping prediction information according to the current behavior information to determine whether the driver is dozing.

In accordance with still another aspect of the present disclosure, a driver assistance method includes matching gripping information on a driver gripping a steering wheel according to behavior information of a vehicle, and generating gripping prediction information based on a result of the matching and comparing current gripping information with the gripping prediction information according to current behavior information and determining whether the driver is dozing, wherein the matching may include detecting the driver gripping the steering wheel to acquire the gripping information, acquiring the behavior information of the vehicle, matching the gripping information according to the behavior information, and storing a result of the matching, and the determining of whether the driver is dozing may include acquiring the current gripping information, acquiring the current behavior information of the vehicle, predicting gripping information according to the current behavior information based on a result of the matching and generating gripping prediction information, and comparing the current gripping information with the gripping prediction information according to the current behavior information and determining whether the driver is dozing.

The gripping information may include contact area information and contact position information between a hand of the driver and the steering wheel as the driver grips the steering wheel, the matching may include matching the area information and the position information according to the behavior information, and the determining of whether the driver is dozing may include generating area prediction information and position prediction information according to the received current behavior information based on a result of the matching and comparing current area information and current position information with the area prediction information and the position prediction information according to the current behavior information, respectively, to determine whether the driver is dozing.

The behavior information may include any one of a vehicle speed, a steering angle, a yaw rate, a lateral acceleration, and a longitudinal acceleration.

The matching may further include receiving driver identification information from a driver identification device of the vehicle, and the matching may include matching the gripping information according to the behavior information for each piece of driver identification information.

The determining of whether the driver is dozing may further include receiving driver identification information from the driver identification device of the vehicle, the generating of the gripping prediction information may include generating gripping prediction information according to the received current behavior information based on a result of the matching for each piece of driver identification information, and the determining of whether the driver is dozing may include comparing the current gripping information with the gripping prediction information according to the behavior information generated based on a result of the matching for each piece of driver identification information to determine whether the driver is dozing.

The driver assistance method may further include outputting an alert to the driver through a driver alert device provided in the vehicle when the driver's dozing is detected.

The matching may include learning and matching the gripping information according to a machine learning algorithm when matching the gripping information according to the behavior information.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The same reference numbers indicate the same components throughout the specification. The specification does not describe all elements of embodiments, and general contents or overlapping contents between the embodiments in the technical field to which the disclosure pertains will be omitted. Terms "unit, module, member, and block" used in the specification may be implemented as software or hardware, and according to the embodiments, a plurality of "units, modules, members, and blocks" may be implemented as one component or one "unit, module, member, and block" may also include a plurality of components.

Throughout the specification, when a certain portion is described as being "connected" to another, this includes not only a case of being directly connected thereto but also a case of being indirectly connected thereto, and the indirect connection includes connection through a wireless communication network.

In addition, when a certain portion is described as "including," a certain component, this means further including other components rather than precluding other components unless especially stated otherwise.

Terms such as first and second are used to distinguish one component from another, and the components are not limited by the above-described terms.

A singular expression includes plural expressions unless the context clearly dictates otherwise.

In each operation, identification symbols are used for convenience of description, and the identification symbols do not describe the sequence of each operation, and each operation may be performed in a different sequence from the specified sequence unless a specific sequence is clearly described in context.

Hereinafter, an operation principle and embodiments of the present disclosure will be described with reference to the accompanying drawings.

Figure 1:
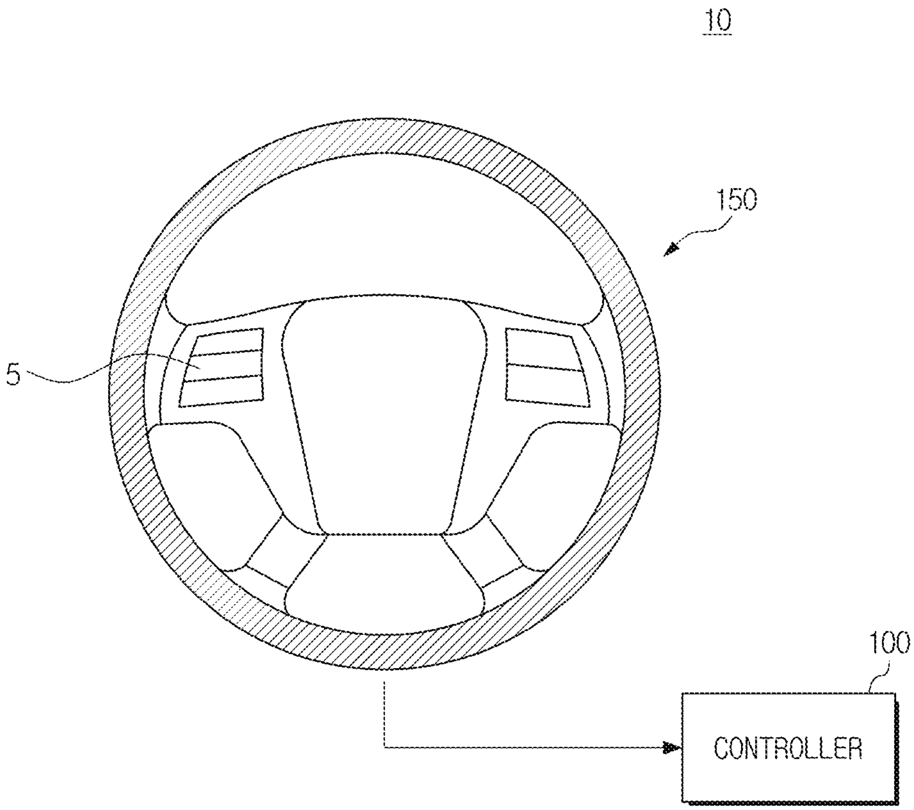
FIG. 1 is a view schematically showing a gripping detection sensor of a driver assistance system according to a first embodiment.
Figure 2:
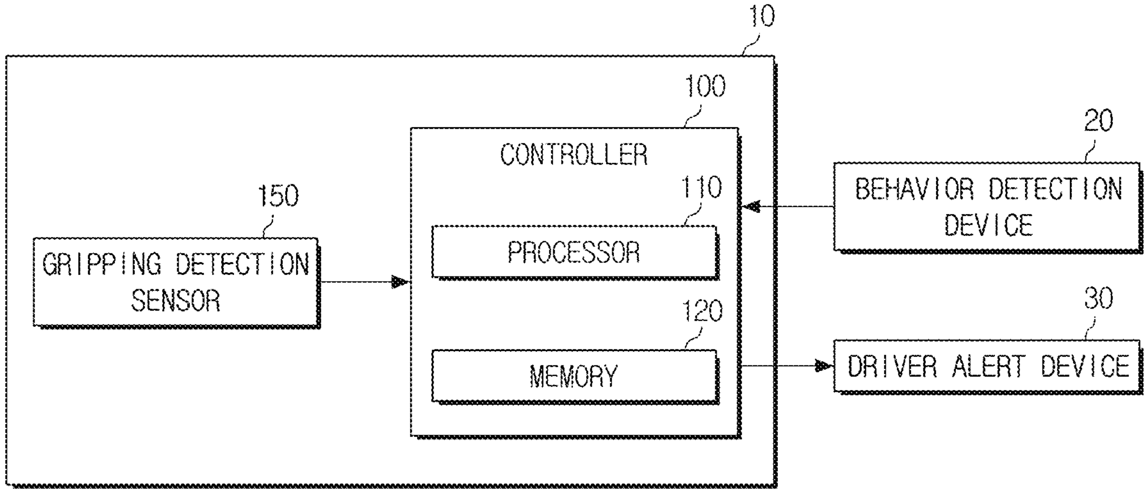
FIG. 2 is a control block diagram of the driver assistance system according to the first embodiment.

FIG. 1 is a view schematically showing a gripping detection sensor of a driver assistance system according to a first embodiment, FIG. 2 is a control block diagram of the driver assistance system according to the first embodiment, and FIGS. 3A, 3B, 3C and 3D are views schematically showing gripping information according to the first embodiment.

Referring to FIGS. 1 and 2, a driver assistance system 10 according to the first embodiment of the present disclosure may include a gripping detection sensor 150, a vehicle behavior detection device 20, a driver alert device 30, and a controller 100.

The gripping detection sensor 150 is provided on a steering wheel 5 of a vehicle and detects a driver gripping the steering wheel 5 to acquire gripping information.

As shown in FIG. 1, the gripping detection sensor 150 may be provided on the steering wheel 5 of a vehicle to detect the driver's gripping. The gripping detection sensor 150 may be provided in various forms capable of directly or indirectly detecting the driver's gripping.

For example, the gripping detection sensor 150 may measure capacitance using a conductive material provided on the steering wheel 5 to detect the driver's gripping.

For example, the gripping detection sensor 150 may measure a change in resistance of an electrode using a stacked resistance film electrode provided on the steering wheel 5 to detect the driver's gripping.

For example, the gripping detection sensor 150 may include a temperature sensor provided on the steering wheel 5 and measure a change in temperature of the steering wheel 5 caused by the driver's gripping to detect the driver's gripping.

As described above, the gripping information acquired through the gripping detection sensor 150 may include contact area information, contact position information, and contact shape information between a hand of the driver and the steering wheel 5 as the driver grips the steering wheel 5 and/or information on pressure applied to the steering wheel 5 when the driver grips the steering wheel 5. In other words, the gripping information may be the area information, the position information, the shape information, or the pressure information or a combination thereof.

FIGS. 3A to 3D shows examples of gripping information 1 acquired by the gripping detection sensor 150.

Figure 3A:
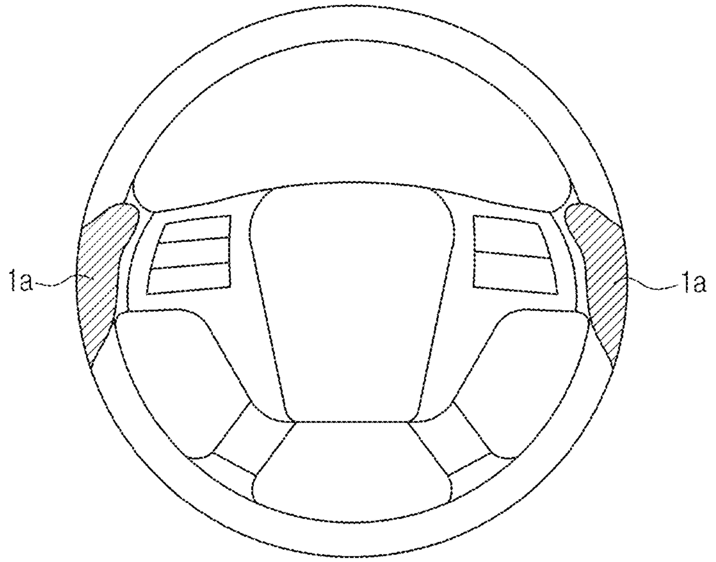
FIGS. 3A, 3B, 3C and 3D are views schematically showing gripping information according to the first embodiment.

FIG. 3A shows gripping information 1*a* in a form in which the hands of the driver are in contact with both left and right sides of the steering wheel 5.

Figure 3B:
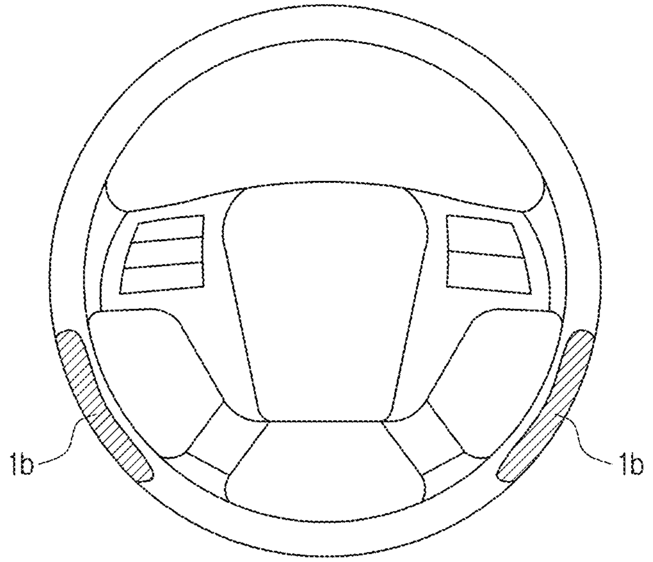

Meanwhile, FIG. 3B shows gripping information 1*b* in a form in which the hands of the driver are in contact with both lower left and right sides of the steering wheel 5. As shown in FIG. 3B, the gripping information 1*b* has a gripping area, a gripping position, and a gripping shape different from those of the gripping information 1*a*.

Figure 3C:
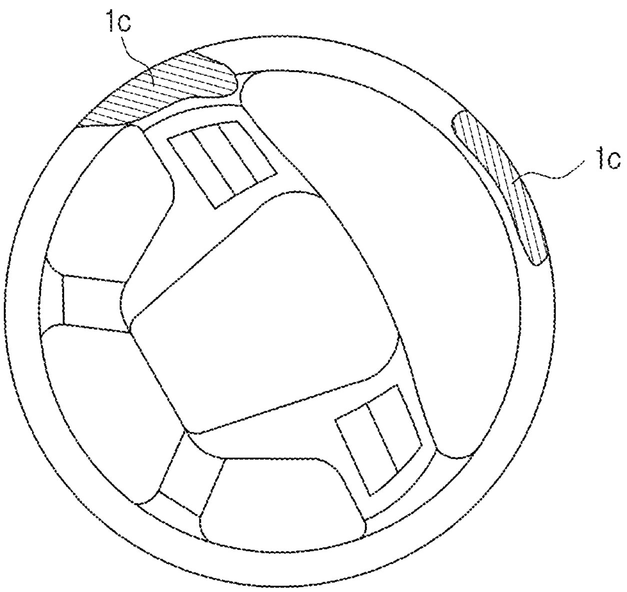

Meanwhile, FIG. 3C shows gripping information 1*c* in a form in which the hands of the driver are in contact with both upper left and right sides of the steering wheel 5 that is rotated clockwise. In this case, since the steering wheel 5 is rotated clockwise at a predetermined angle, positions of the hands of the driver in contact with the steering wheel 5 correspond to the left side and the upper side of the steering wheel 5.

Figure 3D:
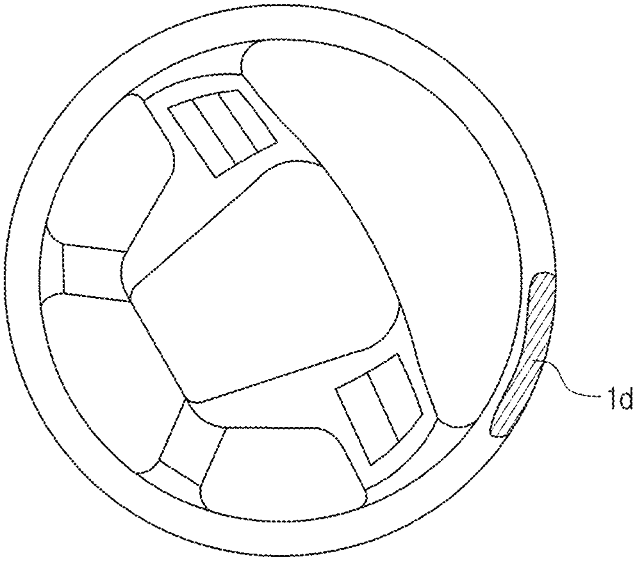

Meanwhile, FIG. 3D shows gripping information 1*d* in a form in which the driver's right hand is in contact with the lower right side of the steering wheel 5 that is rotated clockwise. In this case, since the steering wheel 5 is rotated clockwise at a predetermined angle, the position of the driver's right hand in contact with the steering wheel 5 corresponds to the upper right side of the steering wheel 5.

As described above, the gripping detection sensor 150 may detect the gripping area, position, shape, and/or pressure of the driver on the steering wheel 5 to generate and transmit the gripping information to the controller 100.

Referring back to FIG. 2, the vehicle behavior detection device 20 acquires behavior information of the vehicle. The behavior information may include any one of a vehicle speed, a steering angle, a yaw rate, a lateral acceleration, and a longitudinal acceleration.

The vehicle behavior detection device 20 may acquire and transmit the behavior information of the vehicle to the controller 100.

The driver alert device 30 may output an alert message under the control of the controller 100 when the controller 100 detects the driver's dozing. The driver alert device 30 may output the alert message including at least one of a text, a voice, and an image. In other words, the driver alert device 30 may include an audio device and/or a display device.

Alternatively, when the controller 100 detects the driver's dozing, the driver alert device 30 may apply a physical behavior to the driver to inform the user of an alert under the control of the controller 100. The driver alert device 30 may display the alert through vibration of the steering wheel 5 or a seat belt. In other words, the driver alert device 30 may include an electric actuator.

The controller 100 may determine whether the driver is dozing.

The controller 100 may receive the gripping information from the gripping detection sensor 150.

The controller 100 may receive the behavior information of the vehicle from the vehicle behavior detection device 20.

The controller 100 includes a processor 110 and a memory 120. The controller 100 may include one or more processors 110.

The processor 110 may process the gripping information of the gripping detection sensor 150 and the behavior information of the vehicle behavior detection device 20 and generate control signals for controlling the driver alert device 30. For example, the processor 110 may include a sensor signal processor for processing the gripping information of the gripping detection sensor 150, a digital signal processor for processing the behavior information of the vehicle behavior detection device 20, and/or a micro control unit (MCU) for generating the control signals.

The controller 100 may match the gripping information according to the behavior information.

The controller 100 may receive the gripping information from the gripping detection sensor 150 and, at the same time, receive the behavior information of the vehicle from the vehicle behavior detection device 20. The controller 100 may match the received gripping information with the simultaneously received behavior information.

When matching the gripping information according to the behavior information, the controller 100 may learn and match the gripping information according to the behavior information according to a machine learning algorithm.

The behavior information of the vehicle continuously varies over time while the vehicle travels, and the gripping information accordingly also continuously varies over time. The controller 100 may learn and match the gripping information according to the behavior information received over time according to the machine learning algorithm and analyze a matching pattern between the gripping information and the behavior information.

The controller 100 may predict gripping information according to current behavior information based on a result of the matching to generate gripping prediction information. The controller 100 may match the gripping information according to the behavior information received while the vehicle travels and store a result of the matching. The controller 100 may analyze the stored matching result to predict the gripping information according to the received current behavior information and generate gripping prediction information as the prediction result.

The controller 100 may compare the current gripping information with the gripping prediction information according to the current behavior information to determine whether the driver is dozing.

For example, the behavior information may include a steering angle, and the gripping information may include a gripping area and a gripping position. The driver may have unique gripping habit when driving.

When the driver has the gripping habit as shown in FIG. 3A while driving straight, the gripping detection sensor 150 transmits the gripping information, such as 1*a*, to the controller 100 while driving straight. At this time, the vehicle behavior detection device 20 transmits a steering angle of 0° to the controller 100 because the steering wheel 5 has not been rotated. At this time, the controller 100 may match the steering angle of 0° with the gripping information 1*a* and store a result of the matching.

Meanwhile, when the driver has the gripping habit as shown in FIG. 3C while turning, the gripping detection sensor 150 transmits the gripping information, such as 1*c*, to the controller 100, and the vehicle behavior detection device 20 transmits a steering angle of x° to the controller 100 as the steering wheel 5 rotates at a predetermined angle. At this time, the controller 100 may match the steering angle of x° with the gripping information 1*c* and store a result of the matching.

Then, when the vehicle travels straight, the vehicle behavior detection device 20 transmits the steering angle of 0° to the controller 100. When generating gripping prediction information according to the current steering angle of 0°, the controller 100 may generate gripping prediction information that is the same as the gripping information 1*a* because the steering angle of 0° is matched with the gripping information 1*a* and stored therein.

At this time, when the current gripping information received from the gripping detection sensor 150 is 1*a*, it may be determined that the driver is not dozing because the current gripping information is the same as the gripping prediction information 1*a*. On the other hand, when the current gripping information received from the gripping detection sensor 150 is 1*b*, that is, when the driver grips the steering wheel 5 but is only in contact with the steering wheel 5 with a smaller area at a lower position than the usual gripping position, it may be determined that the driver is dozing.

Likewise, when the vehicle turns, the vehicle behavior detection device 20 transmits the steering angle of x° to the controller 100. When generating the gripping prediction information according to the current steering angle of x°, the controller 100 may generate gripping prediction information that is the same as the gripping information 1*c* because the steering angle of x° is matched with the gripping information 1*c* and stored therein.

At this time, when the current gripping information received from the gripping detection sensor 150 is 1*c*, it may be determined that the driver is not dozing because the current gripping information is the same as the gripping prediction information 1*c*. On the other hand, when the current gripping information received from the gripping detection sensor 150 is 1*d*, that is, when the driver grips the steering wheel 5 but grips the steering wheel 5 with only the right hand at a lower position than the usual gripping position, it may be determined that the driver is dozing.

In other words, the controller 100 may match the gripping information (area information, position information, shape information, and/or pressure information) according to the behavior information, generate gripping prediction information (area prediction information, position prediction information, shape prediction information, and/or pressure prediction information) according to the received current behavior information based on a result of the matching, and compare the current gripping information (area information, position information, shape information, and/or pressure information) with the gripping prediction information (area prediction information, position prediction information, shape prediction information, and/or pressure prediction information) according to the current behavior information, respectively, to determine whether the driver is dozing.

For example, when the gripping information includes the area information and the position information, the controller 100 matches the area information and the position information according to the behavior information and stores a result of the matching. Then, based on the stored matching information, the controller 100 generates the area prediction information and the position prediction information according to the current behavior information. Then, the controller 100 may compare current area information with the area prediction information according to the current behavior information and compare current position information with the position prediction information according to the current behavior information to determine whether the driver is dozing.

When detecting the driver's dozing, the controller 100 may output an alert to the driver through the driver alert device 30.

Figure 4:
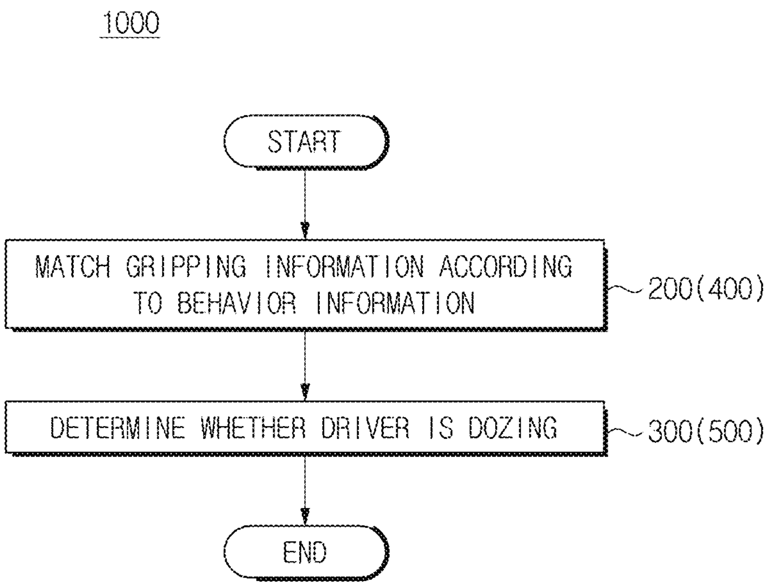
FIG. 4 is a control flowchart of a driver assistance method according to the first embodiment.
Figure 5:
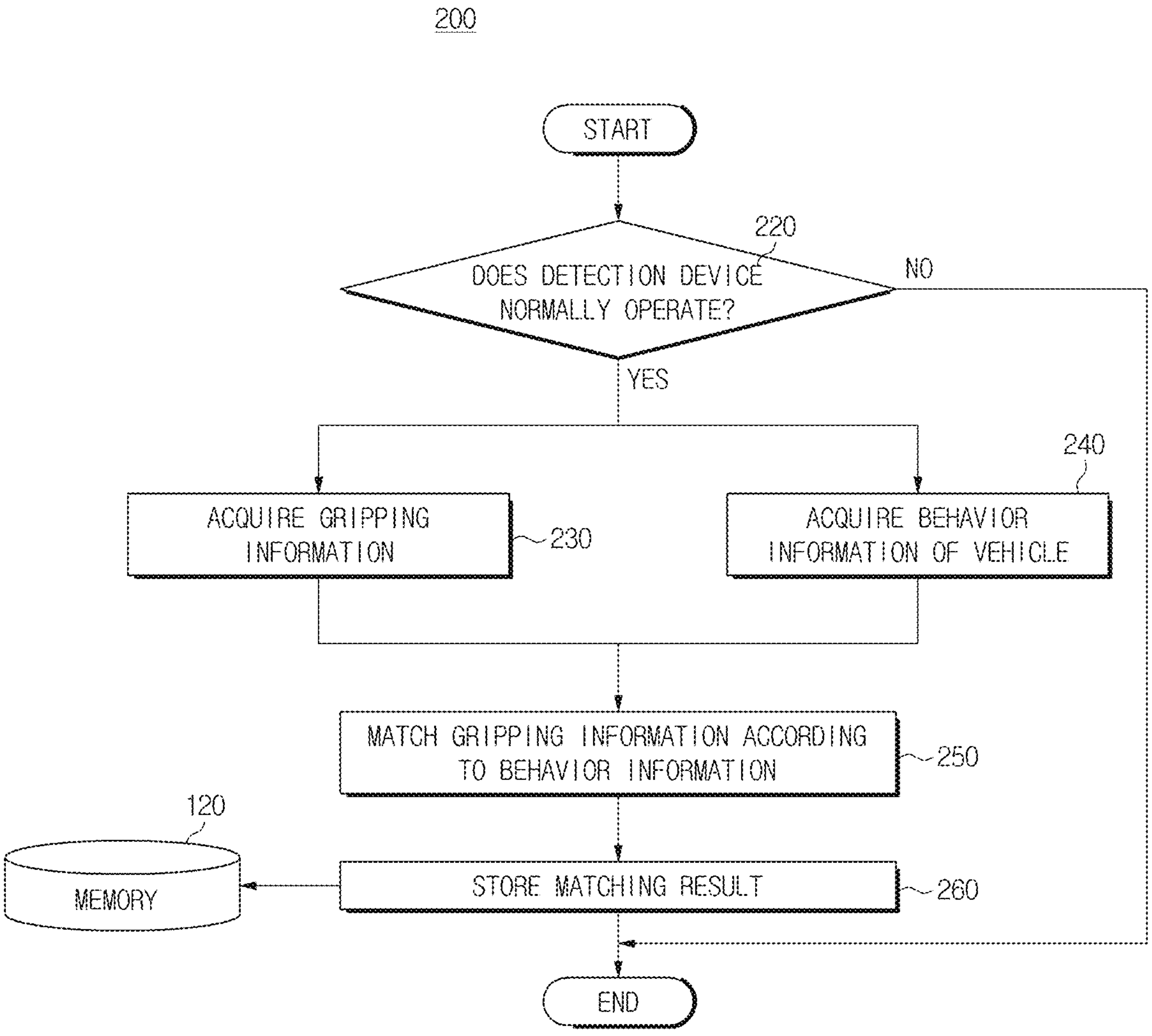
FIG. 5 is a control flowchart of an operation of learning gripping information in the driver assistance method according to the first embodiment.
Figure 6:
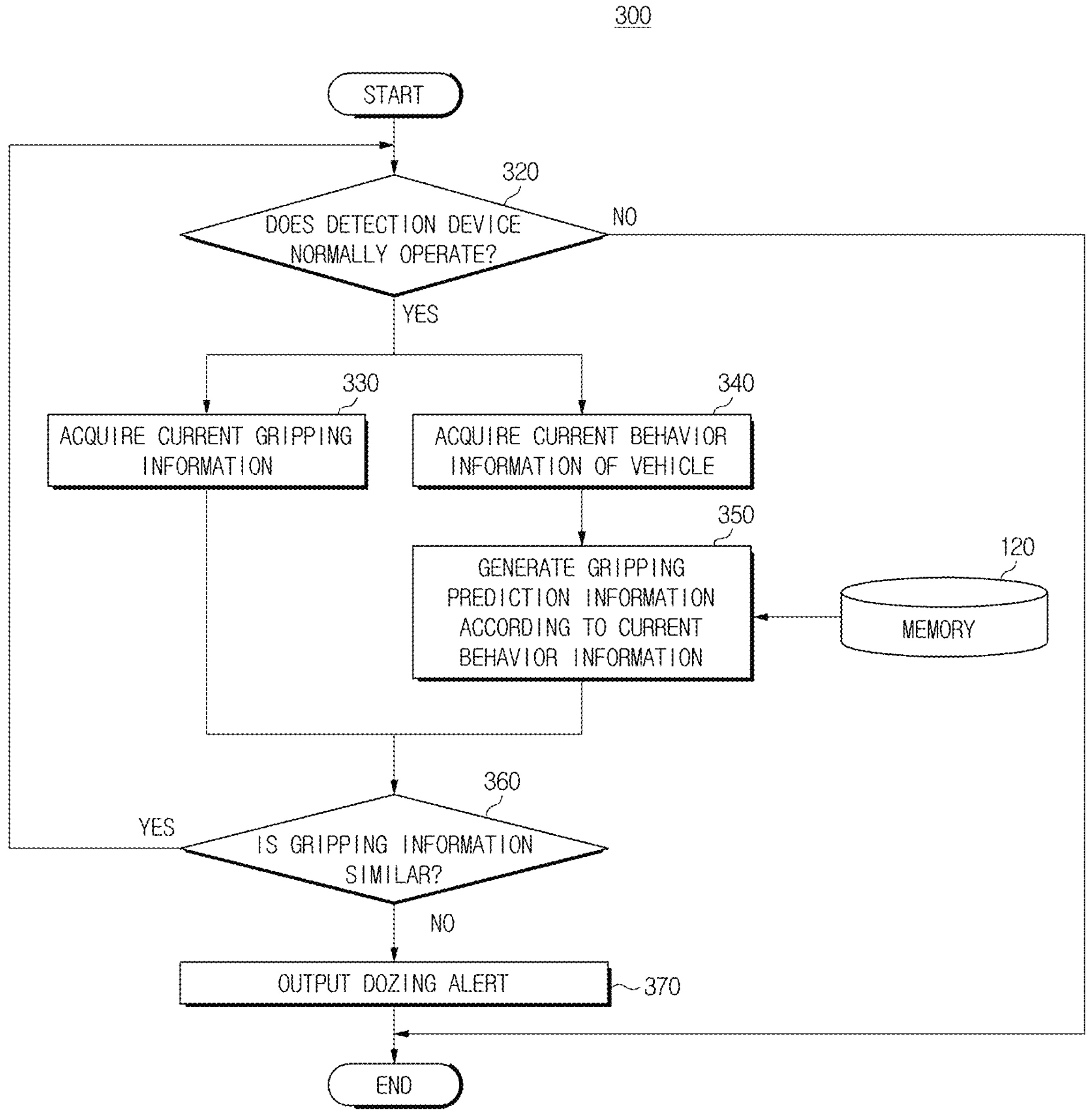
FIG. 6 is a control flowchart of an operation of determining whether a driver is dozing in the driver assistance method according to the first embodiment.

FIG. 4 is a control flowchart of a driver assistance method according to the first embodiment, FIG. 5 is a control flowchart of an operation of learning gripping information in the driver assistance method according to the first embodiment, and FIG. 6 is a control flowchart of an operation of determining whether a driver is dozing in the driver assistance method according to the first embodiment. The driver assistance method shown in FIGS. 4 to 6 may be performed by the driver assistance system 10 shown in FIG. 2.

Referring to FIG. 4, a driver assistance method 1000 according to the first embodiment of the present disclosure may include an operation 200 of matching the gripping information on the driver gripping the steering wheel according to the behavior information of the vehicle and an operation 300 of generating the gripping prediction information based on a result of the matching and comparing the current gripping information with the gripping prediction information according to the current behavior information to determine whether the driver is dozing.

The driver assistance method 1000 according to the first embodiment will be described in more detail with reference to FIGS. 5 and 6.

Referring to FIG. 5, the operation 200 of matching the gripping information on the driver gripping the steering wheel according to the behavior information of the vehicle may include an operation of determining whether the gripping detection sensor 150 normally operates (220), an operation of detecting the driver gripping the steering wheel 5 to acquire the gripping information (230), an operation of acquiring the behavior information of the vehicle (240), an operation of matching the gripping information according to the behavior information (250), and an operation of storing a result of the matching (260).

First, the controller 100 determines whether the gripping detection sensor 150 normally operates. Since the controller 100 does not acquire the gripping information of the driver when the gripping detection sensor 150 does not normally operate (NO in 220), the controller 100 terminates the control.

When the gripping detection sensor 150 normally operates (YES in 220), the gripping detection sensor 150 detects the driver gripping the steering wheel 5 to generate gripping information, and the controller 100 acquires the gripping information from the gripping detection sensor 150 (230). The gripping information may include contact area information, contact position information, and contact shape information between the hand of the driver and the steering wheel 5 as the driver grips the steering wheel 5 and/or information on pressure applied to the steering wheel 5 when the driver grips the steering wheel 5.

Meanwhile, when the gripping detection sensor 150 normally operates (YES in 220), the vehicle behavior detection device 20 detects the behavior of the vehicle to generate behavior information, and the controller 100 receives the behavior information from the vehicle behavior detection device 20 (240). The behavior information may include any one of a vehicle speed, a steering angle, a yaw rate, a lateral acceleration, and a longitudinal acceleration.

As described above, it is preferable that the operation of acquiring the gripping information (230) and the operation of acquiring the behavior information (240) are performed simultaneously, but any one may be first performed and then the other may be performed.

Then, the controller 100 matches the gripping information according to the behavior information (250).

When matching the gripping information according to the behavior information, the controller 100 may match the area information, the position information, the shape information, and/or the pressure information according to the behavior information.

When matching the gripping information according to the behavior information, the controller 100 may learn and match the gripping information and the behavior information according to the machine learning algorithm.

Then, the controller 100 stores a result of the matching (260). At this time, the controller 100 may store a result of the matching in the memory 120.

Meanwhile, referring to FIG. 6, the operation of determining whether the driver is dozing (300) may include an operation of determining whether the gripping detection sensor 150 normally operates (320), an operation of acquiring the current gripping information (330), an operation of acquiring the current behavior information of the vehicle (340), an operation of predicting the gripping information with the current behavior information based on a result of the matching to generate gripping prediction information (350), an operation of comparing the current gripping information with the gripping prediction information according to the current gripping information to determine whether the driver is dozing (360), and an operation of outputting the alert to the driver through the driver alert device provided in the vehicle when the driver's dozing is detected (370).

First, the controller 100 determines whether the gripping detection sensor 150 normally operates (320). This is the same as the operation of determining whether the gripping detection sensor 150 normally operates (220) in the operation of matching the gripping information (200). Since the controller 100 does not acquire the gripping information of the driver when the gripping detection sensor 150 does not normally operate (NO in 320), the controller 100 terminates the control.

When the gripping detection sensor 150 normally operates (YES in 320), the gripping detection sensor 150 detects the driver gripping the steering wheel 5 to generate current gripping information, and the controller 100 acquires the current gripping information from the gripping detection sensor 150 (330).

Meanwhile, when the gripping detection sensor 150 normally operates (YES in 320), the vehicle behavior detection device 20 detects the current behavior of the vehicle to generate current behavior information, and the controller 100 acquires the current behavior information from the vehicle behavior detection device 20 (340).

As described above, it is preferable that the operation of acquiring the current gripping information (330) and the operation of acquiring the current behavior information (340) are simultaneously performed, but any one may be first performed and then the other may be performed.

Then, the controller 100 predicts the gripping information according to the current behavior information based on a result of the matching to generate gripping prediction information (350).

The controller 100 may match the gripping information according to the behavior information received while the vehicle travels and store a result of the matching. The controller 100 may analyze the stored matching result to predict the gripping information according to the received current behavior information and generate gripping prediction information as the prediction result.

Then, the controller 100 compares the current gripping information with the gripping prediction information according to the current behavior information to determine whether the driver is dozing (360).

The controller 100 may determine whether the current gripping information and the gripping prediction information according to the current behavior information are similar to each other to determine whether the driver is dozing. The controller 100 may determine that the driver is dozing when an error between the current gripping information and the gripping prediction information according to the current behavior information is out of a predetermined range to detect the driver's dozing.

At this time, the predetermined range may be a predetermined value or a predetermined ratio.

When detecting the driver's dozing (NO in 360), the controller 100 outputs the alert to the driver through the driver alert device 30 provided in the vehicle (370).

Under the control of the controller 100, the driver alert device 30 may output the alert message including at least one of a text, a voice, and an image or display the alert through the physical movement of the steering wheel 5 or the seat belt.

Figure 7:
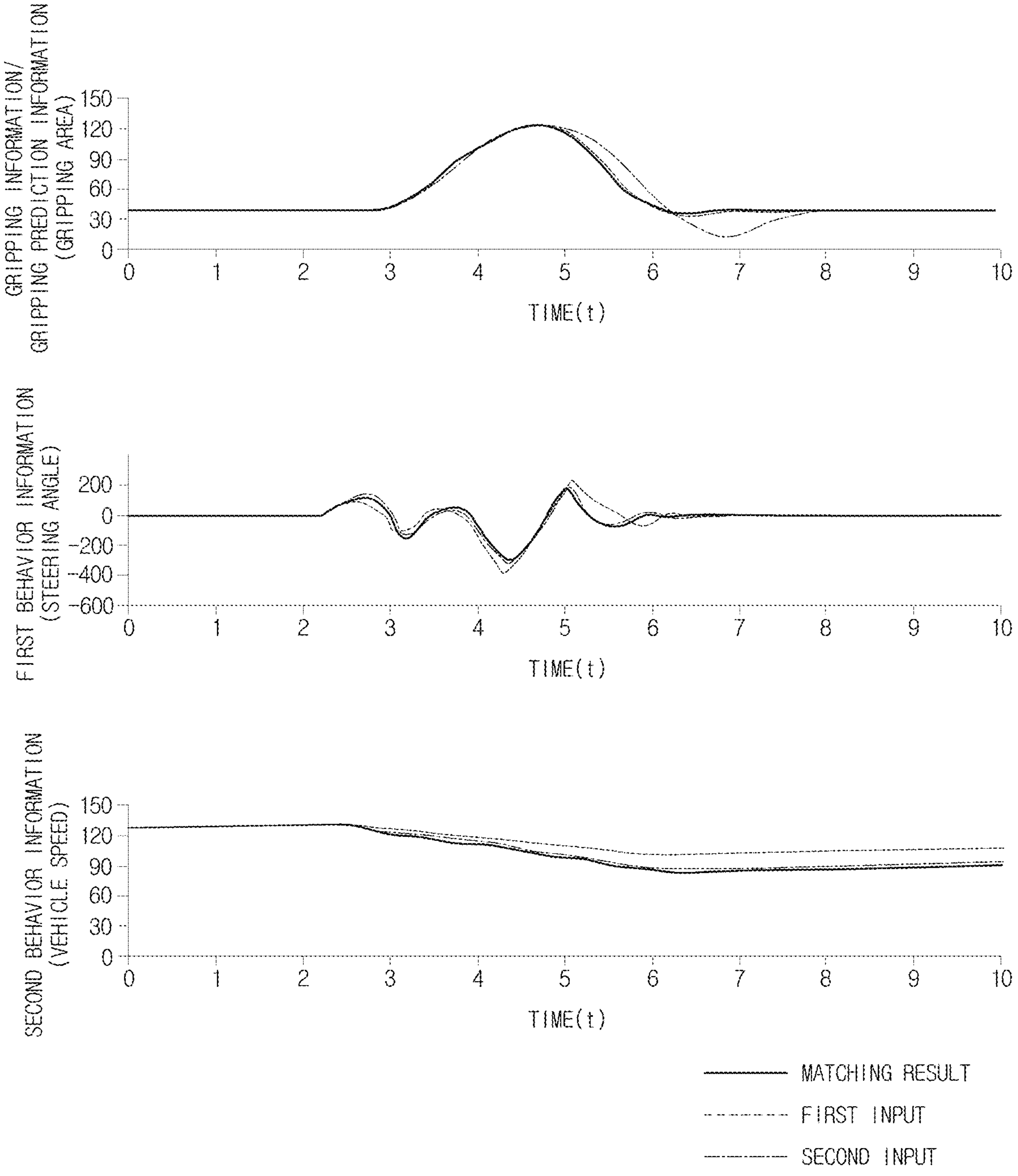
FIG. 7 is a view schematically showing an example of gripping information and behavior information in the driver assistance method according to the first embodiment.

FIG. 7 is a view schematically showing an example of gripping information and behavior information in the driver assistance method according to the first embodiment.

FIG. 7 shows an example of gripping information, gripping prediction information, and behavior information over a time t.

As shown, the vehicle traveled according to a steering angle and a vehicle speed indicated by solid lines, and a gripping area at this time was stored together by the matching of the controller 100. The matched gripping area is indicated by a solid line.

Then, the vehicle traveled almost similarly to a result of the matching of the steering angle and the vehicle speed with a first input. The gripping information of the first input is indicated by a dotted line.

When the vehicle travels like the first input, the controller 100 predicts the gripping information according to the current behavior information (dotted line) based on a result of the matching to generate gripping prediction information (solid line). In other words, since the current (first input) behavior information (dotted line) and the behavior information (solid line) of a result of the matching are similar, the gripping information (solid line) of a result of the matching may be generated as the gripping prediction information.

Then, the controller 100 compares the current (first input) gripping information (dotted line) with the gripping prediction information (solid line) to detect the driver's dozing. As shown, when the current gripping information (dotted line) and the gripping prediction information (solid line) do not match each other but it is determined that an error is within the predetermined range, it may be determined that the driver is not dozing.

Meanwhile, when the vehicle travels like a second input, the controller 100 predicts the gripping information according to the current behavior information (dashed-dotted line) based on a result of the matching to generate gripping prediction information (solid line). In other words, since the current (second input) behavior information (dashed-dotted line) and the behavior information (solid line) of a result of the matching are similar, the gripping information (solid line) of a result of the matching may be generated as the gripping prediction information.

Then, the controller 100 compares the current (second input) gripping information (dashed-dotted line) with the gripping prediction information (solid line) to detect the driver's dozing. As shown, when it is determined that the error between the current gripping information (dashed-dotted line) and the gripping prediction information (solid line) is out of the predetermined range (in a range of $6<t<7$), it may be determined that the driver is dozing to detect the driver's dozing.

Figure 8:
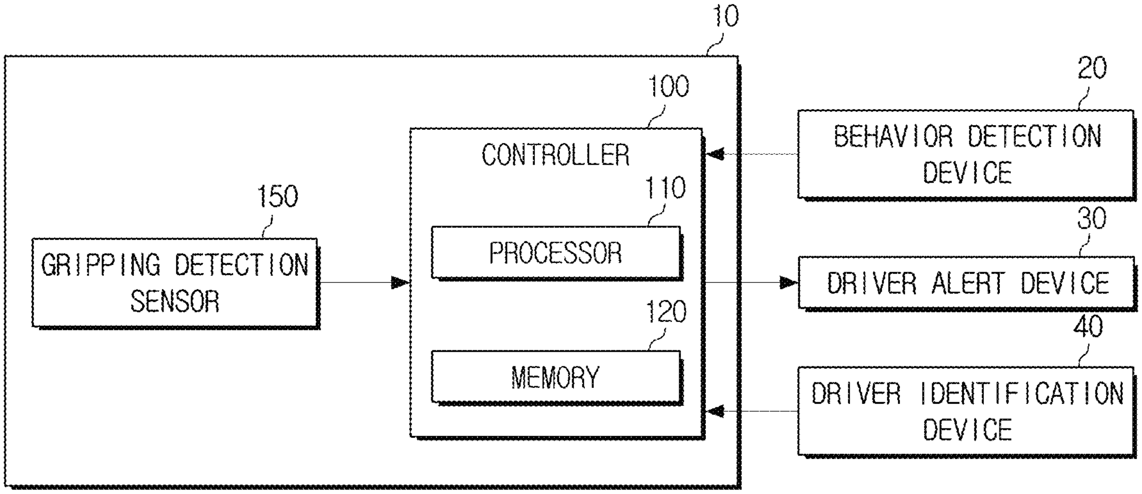
FIG. 8 is a control block diagram of a driver assistance system according to a second embodiment.

FIG. 8 is a control block diagram of a driver assistance system according to a second embodiment. Hereinafter, a detailed description of the same components as the first embodiment among components of the second embodiment will be omitted. Although not described below, the configuration of the second embodiment may be the same as that of the first embodiment.

Referring to FIGS. 2 and 8, a driver assistance system 10 according to a second embodiment of the present disclosure may include the gripping detection sensor 150, the vehicle behavior detection device 20, the driver alert device 30, a driver identification device 40, and the controller 100.

Since the gripping detection sensor 150, the vehicle behavior detection device 20, and the driver alert device 30 are the same as those of the driver assistance system 10 according to the first embodiment shown in FIG. 2, detailed descriptions thereof will be omitted.

The driver identification device 40 may identify the driver of the vehicle and generate identification information on the identified driver to transmit the generated identification information to the controller 100.

The driver identification device 40 may acquire information on the driver of the vehicle and identify the driver based on the acquired information on the driver. For example, the driver identification device 40 may acquire information (e.g., image information) on a facial shape of the driver of the vehicle and analyze the acquired information to identify the driver. Alternatively, the driver identification device 40 may receive information (e.g., an ID card or a vehicle key for each driver) from the identification device owned by the driver of the vehicle.

As described above, identification information for the identified driver may be generated and transmitted to the controller 100, and the controller 100 may control the vehicle differently for each driver based on the driver identification information to perform driver assistance.

As described above, the controller 100 may determine whether the driver is dozing, receive the gripping information from the gripping detection sensor 150, and receive the behavior information of the vehicle from the vehicle behavior detection device 20.

In addition, the controller 100 may receive the driver identification information from the driver identification device 40.

The controller 100 includes the processor 110 and the memory 120. The controller 100 may include one or more processors 110.

The processor 110 may process the gripping information of the gripping detection sensor 150 and the behavior information of the vehicle behavior detection device 20 and generate control signals for controlling the driver alert device 30. For example, the processor 110 may include the sensor signal processor for processing the gripping information of the gripping detection sensor 150, the digital signal processor for processing the behavior information of the vehicle behavior detection device 20, and/or the MCU for generating the control signals.

The controller 100 may match the gripping information according to the behavior information.

The controller 100 may receive the gripping information from the gripping detection sensor 150 and, at the same time, receive the behavior information of the vehicle from the vehicle behavior detection device 20. The controller 100 may match the received gripping information with the simultaneously received behavior information. This is the same as the controller 100 of the first embodiment.

At this time, the controller 100 may match the gripping information according to the behavior information for each piece of driver identification information received from the driver identification device 40 of the vehicle.

Unlike the first embodiment, the controller 100 in the second embodiment may receive the driver identification information from the driver identification device 40. The controller 100 may match the gripping information according to the behavior information for each received driver identification information to perform a separate matching for each driver.

Meanwhile, the controller 100 may generate gripping prediction information according to the received current behavior information based on a result of the matching for each piece of driver identification information and compare the current gripping information with the gripping prediction information according to the current behavior information generated based on a result of the matching for each piece of driver identification information to determine whether the driver is dozing.

Likewise, when generating the gripping prediction information, the controller 100 may generate gripping prediction information based on a result of the matching for each piece of driver identification information to generate gripping prediction information more suitable for the identified current driver. Therefore, by comparing the current gripping information with the gripping prediction information according to the current behavior information generated based on a result of the matching for each piece of driver identification information, it is possible to more accurately determine whether the driver is dozing.

Figure 9:
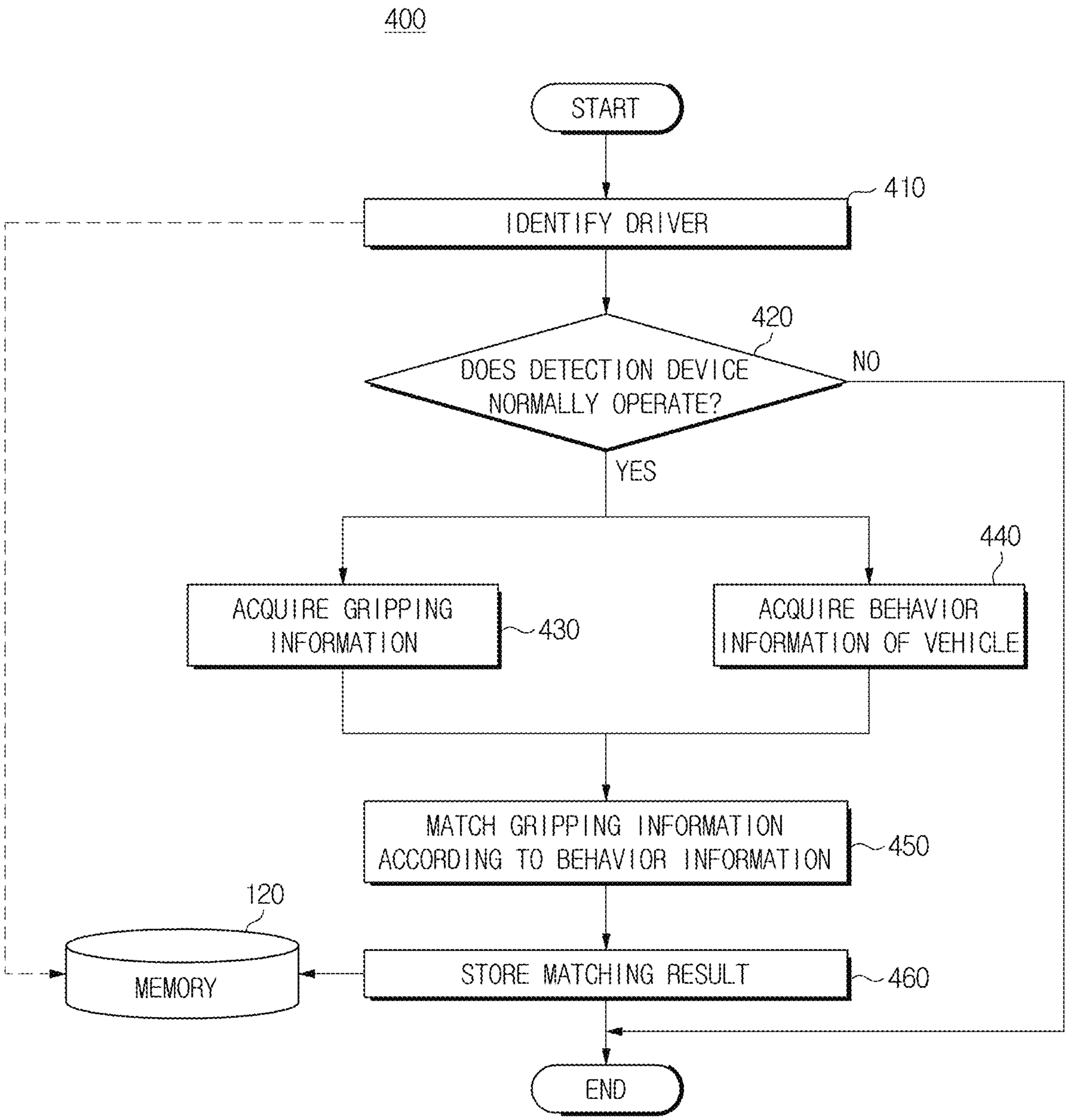
FIG. 9 is a control flowchart of an operation of learning gripping information in a driver assistance method according to the second embodiment.
Figure 10:
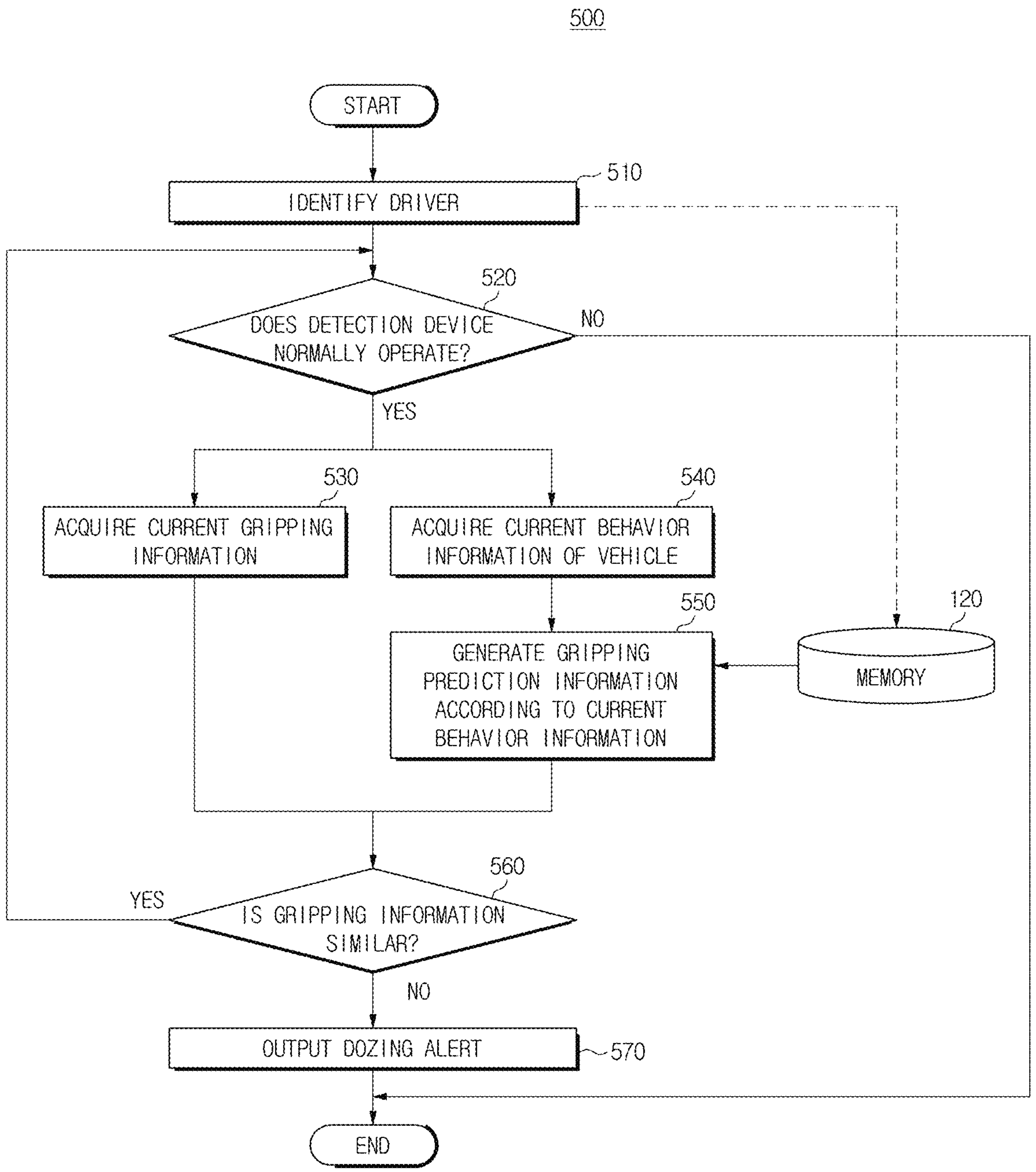
FIG. 10 is a control flowchart of an operation of determining whether a driver is dozing in the driver assistance method according to the second embodiment.

FIG. 9 is a control flowchart of an operation of learning gripping information in a driver assistance method according to the second embodiment, and FIG. 10 is a control flowchart of an operation of determining whether a driver is dozing in the driver assistance method according to the second embodiment. The driver assistance method shown in FIGS. 9 and 10 may be performed by the driver assistance system 10 shown in FIG. 8.

Meanwhile, as in the driver assistance method 1000 according to the first embodiment shown in FIG. 4, the driver assistance method 1000 according to the second embodiment may include an operation of matching the gripping information on the driver gripping the steering wheel according to the behavior information of the vehicle (400) and an operation of generating the gripping prediction information based on a result of the matching and comparing the current gripping information with the gripping predication information according to the current behavior information to determine whether the driver is dozing (500).

The driver assistance method 1000 according to the second embodiment will be described in more detail with reference to FIGS. 9 and 10.

Referring to FIG. 9, the operation of matching the gripping information on the driver gripping the steering wheel according to the behavior information of the vehicle (400) may include an operation of receiving, from the driver identification device 40 of the vehicle, driver identification information (410), an operation of determining whether the gripping detection sensor 150 normally operates (420), an operation of detecting the driver gripping the steering wheel 5 to acquire the gripping information (430), an operation of acquiring the behavior information of the vehicle (440), an operation of matching the gripping information according to the behavior information (450), and an operation of storing a result of the matching (460).

First, the controller 100 receives the driver identification information from the driver identification device 40 (410). The driver identification device 40 identifies the driver of the vehicle to generate identification information on the identified driver, and the controller 100 receives the driver identification information.

Then, the controller 100 performs the operation of determining whether the gripping detection sensor 150 normally operates (420), the operation of detecting the driver gripping the steering wheel 5 to acquire the gripping information (430), and the operation of acquiring the behavior information of the vehicle (440). Since this is the same as the operation of determining whether the gripping detection sensor 150 normally operates (220), the operation of detecting the driver gripping the steering wheel 5 to acquire the gripping information (230), and the operation of acquiring the behavior information of the vehicle (240), detailed descriptions thereof will be omitted.

Then, the controller 100 matches the gripping information according to the behavior information (450).

When matching the gripping information according to the behavior information, the controller 100 may match the gripping information according to the behavior information for each piece of driver identification information. Since each driver has a unique gripping pattern of the steering wheel 5, the controller 100 may match the gripping information according to the behavior information for each piece of driver identification information so that the analysis for each driver may be performed without mixing the gripping information of different drivers.

Meanwhile, since the matching of the gripping information according to the behavior information is the same as in the first embodiment, a detailed description thereof will be omitted.

Then, the controller 100 stores a result of the matching (460). At this time, the controller 100 may classify and store a result of the matching for each driver in the memory 120.

Meanwhile, referring to FIG. 10, the operation of determining whether the driver is dozing (500) may include an operation of receiving the driver identification information from the driver identification device 40 of the vehicle (510), an operation of determining whether the gripping detection sensor 150 normally operates (520), an operation of acquiring the current gripping information (530), an operation of acquiring the current behavior information of the vehicle (540), an operation of predicting the gripping information according to the current behavior information based on a result of the matching to generate gripping prediction information (550), an operation of comparing the current gripping information with the gripping prediction information according to the current behavior information to determine whether the driver is dozing (560), and an operation of outputting the alert to the driver through the driver alert device provided in the vehicle when the driver's dozing is detected (570).

First, the controller 100 receives the driver identification information from the driver identification device 40 (510). The driver identification device 40 identifies the driver of the vehicle to generate identification information on the identified driver, and the controller 100 receives the driver identification information.

Then, the controller 100 performs the operation of determining whether the gripping detection sensor 150 normally operates (520), the operation of acquiring the current gripping information (530), and the operation of acquiring the current behavior information of the vehicle (540). Since this is the same as the operation of determining whether the gripping detection sensor 150 normally operates (320), the operation of acquiring the current gripping information (330), and the operation of acquiring the current behavior information of the vehicle (340) in the first embodiment, detailed descriptions thereof will be omitted.

Then, the controller 100 predicts the gripping information according to the current behavior information based on a result of the matching to generate gripping prediction information (550).

At this time, the controller 100 may generate gripping prediction information according to the received current behavior information based on a result of the matching for each piece of driver identification information. As described above with reference to FIG. 9, when matching the gripping information according to the behavior information, the controller 100 may match the gripping information according to the behavior information for each piece of driver identification information. As described above, the controller 100 generates the gripping prediction information according to the current behavior information for each piece of driver identification information based on the gripping information according to the behavior information matched for each piece of driver identification information.

Then, the controller 100 compares the current gripping information with the gripping prediction information according to the current behavior information to determine whether the driver is dozing (560).

At this time, the controller 100 may compare the current gripping information with the gripping prediction information according to the current behavior information generated based on a result of the matching for each piece of driver identification information to determine whether the driver is dozing.

Then, when detecting the driver's dozing, the controller 100 performs the operation of outputting the alert to the driver through the driver alert device provided in the vehicle (570). Since this is the same as the operation of outputting the alert to the driver through the driver alert device provided in the vehicle when the driver's dozing is detected (370) in the first embodiment, a detailed description thereof will be omitted.

As described above, in the second embodiment, the controller 100 may separately match the gripping information according to the behavior information according to the driver identification information, generate gripping prediction information based on a result of the matching according to the driver identification information even when generating the gripping prediction information, and compare the gripping prediction information generated according to the driver identification information with the current gripping information, thereby considering the gripping information that may vary depending on the driver and further increasing the driver's dozing detection accuracy.

As is apparent from the above description, a driver assistance system and a driver assistance method according to the present disclosure can match a driver gripping a steering wheel with behavior information of a vehicle and determine whether the driver is dozing, thereby increasing the accuracy of the determination.

The driver assistance system and the driver assistance method according to the present disclosure can identify the driver and determine whether the driver is dozing according to a gripping pattern that varies depending on the driver, thereby increasing the accuracy of the determination.

The disclosed embodiments have been described above with reference to the accompanying drawings. Those skilled in the art to which the present disclosure pertains will understand that the present disclosure can be practiced in a form different from the disclosed embodiments even without changing the technical spirit or essential features of the present disclosure. The disclosed embodiments are illustrative and should not be construed as limiting.

What is claimed is:

1. A driver assistance system comprising:

a gripping detection sensor provided on a steering wheel of a vehicle and configured to detect a driver gripping the steering wheel by measuring any one of capacitance, a change in resistance, and a change in temperature and acquire gripping information including at least one of a contact area, a contact position, and a contact pressure; and a controller configured to receive the gripping information from the gripping detection sensor, receive driver identification information from a driver identification device of the vehicle, receive behavior information of the vehicle including at least one of a vehicle speed, a steering angle, a yaw rate, a lateral acceleration, and a longitudinal acceleration of the vehicle, and determine whether the driver is dozing, wherein the controller is configured to:

match the gripping information received from the gripping detection sensor with the behavior information of the vehicle for the identified driver, and separately store a result of the matching for the identified driver;

generate gripping prediction information by predicting gripping information according to current behavior information of the vehicle based on the separately stored result of the matching to represent a learned gripping pattern of the identified driver corresponding to the current behavior information; and determine whether the driver is dozing by determining an error between current gripping information, detected by the gripping detection sensor, and the gripping prediction information generated based on the current behavior information of the vehicle including at least one of the vehicle speed, the steering angle, the yaw rate, the lateral acceleration, and the longitudinal acceleration of the vehicle, and by determining that the driver is dozing when the determined error is out of a predetermined range.

2. The driver assistance system of claim 1, wherein the gripping information includes contact area information and contact position information between a hand of the driver and the steering wheel as the driver grips the steering wheel, and the controller is configured to:

match the area information and the position information according to the behavior information of the vehicle for the identified driver; and generate area prediction information and position prediction information according to the received current behavior information of the vehicle based on the separately stored result of the matching to represent the learned gripping pattern of the identified driver, determine an error between current area information and the area prediction information and between current position information and the position prediction information according to the current behavior information of the vehicle, respectively, and determine that the driver is dozing when the determined error is out of the predetermined range.

3. The driver assistance system of claim 2, wherein the gripping information further includes contact shape information between the hand of the driver and the steering wheel as the driver grips the steering wheel, and the controller is configured to:

further match the shape information according to the behavior information of the vehicle for the identified driver; and further generate shape prediction information according to the received behavior information of the vehicle based on a result of the matching to represent the learned gripping pattern of the driver, further determine an error between current shape information and the shape prediction information according to the current behavior information of the vehicle, and determine that the driver is dozing when the determined error is out of the predetermined range.

4. The driver assistance system of claim 2, wherein the gripping information further includes information on pressure applied to the steering wheel as the driver grips the steering wheel, and the controller is configured to:

further match the pressure information according to the behavior information of the vehicle for the identified driver, and further generate pressure prediction information according to the received behavior information of the vehicle based on a result of the matching to represent the learned gripping pattern of the driver, further determine an error between current pressure information and the pressure prediction information according to the current behavior information of the vehicle, and determine that the driver is dozing when the determined error is out of the predetermined range.

5. The driver assistance system of claim 1, wherein the controller outputs an alert to the driver through a driver alert device provided in the vehicle when the driver's dozing is detected.

6. The driver assistance system of claim 1, wherein the controller learns and matches the gripping information according to a machine learning algorithm when matching the gripping information according to the behavior information of the vehicle.

7. A driver assistance system comprising:

a controller configured to receive gripping information including at least one of a contact area, a contact position, and a contact pressure from a gripping detection sensor provided on a steering wheel of a vehicle and configured to detect a driver gripping the steering wheel by measuring any one of capacitance, a change in resistance, and a change in temperature to acquire the gripping information, receive driver identification information from a driver identification device of the vehicle, receive behavior information of the vehicle including any one of a vehicle speed, a steering angle, a yaw rate, a lateral acceleration, and a longitudinal acceleration, and determine whether the driver is dozing, wherein the controller is configured to:

match the gripping information received from the gripping detection sensor with the behavior information of the vehicle for the identified driver, and separately store a result of the matching for the identified driver;

generate gripping prediction information by predicting gripping information according to current behavior information of the vehicle based on the separately stored result of the matching to represent a learned gripping pattern of the identified driver corresponding to the current behavior information; and determine whether the driver is dozing by determining an error between current gripping information, detected by the gripping detection sensor, and the gripping prediction information generated based on the current behavior information of the vehicle including at least one of the vehicle speed, the steering angle, the yaw rate, the lateral acceleration, and the longitudinal acceleration of the vehicle, and by determining that the driver is dozing when the determined error is out of a predetermined range.

8. A driver assistance method comprising:

matching gripping information on a driver gripping a steering wheel according to behavior information of a vehicle; and generating gripping prediction information based on a result of the matching, and determining an error between current gripping information and the gripping prediction information according to current behavior information of the vehicle and determining whether the driver is dozing, wherein the matching includes receiving driver identification information from a driver identification device of the vehicle, detecting the driver gripping the steering wheel by measuring any one of capacitance, a change in resistance, and a change in temperature to acquire the gripping information including at least one of a contact area, a contact position, and a contact pressure, acquiring the behavior information of the vehicle including any one of a vehicle speed, a steering angle, a yaw rate, a lateral acceleration, and a longitudinal acceleration, matching the gripping information with the behavior information of the vehicle simultaneously acquired for the identified driver, and separately storing a result of the matching for the identified driver, and the determining of whether the driver is dozing includes acquiring the current gripping information, acquiring the current behavior information of the vehicle, generating gripping prediction information by predicting gripping information according to the current behavior information of the vehicle based on the separately stored result of the matching to represent a learned gripping pattern of the identified driver corresponding to the current behavior information, and determining whether the driver is dozing by determining an error between the current gripping information, detected by the gripping detection sensor, and the gripping prediction information generated based on the current behavior information of the vehicle including at least one of the vehicle speed, the steering angle, the yaw rate, the lateral acceleration, and the longitudinal acceleration of the vehicle, and by determining that the driver is dozing when the determined error is out of a predetermined range.

9. The driver assistance method of claim 8, wherein the gripping information includes contact area information and contact position information between a hand of the driver and the steering wheel as the driver grips the steering wheel, the matching includes matching the area information and the position information according to the behavior information of the vehicle for the identified driver, and the determining of whether the driver is dozing includes generating area prediction information and position prediction information according to the received current behavior information of the vehicle based on the separately stored result of the matching to represent the learned gripping pattern of the identified driver, determining an error between current area information and the area prediction information and between current position information and the position prediction information according to the current behavior information of the vehicle, respectively, and determining that the driver is dozing when the determined error is out of the predetermined range.

10. The driver assistance method of claim 8, further comprising outputting an alert to the driver through a driver alert device provided in the vehicle when the driver's dozing is detected.

11. The driver assistance method of claim 8, wherein the matching includes learning and matching the gripping information according to a machine learning algorithm when matching the gripping information according to the behavior information of the vehicle.

* * * * *